United States Patent
Warnock et al.

(10) Patent No.: US 12,526,321 B2
(45) Date of Patent: Jan. 13, 2026

(54) ELECTRONIC COMMUNICATION LISTS MONITORING AND TRACKING

(71) Applicant: Project Bordeaux, Inc., Charlotte, NC (US)

(72) Inventors: Jason Warnock, Charlotte, NC (US); Jeff Hulshof, Charlotte, NC (US); Matt McFee, Charlotte, NC (US)

(73) Assignee: Project Bordeaux, Inc., Charlotte, NC (US)

( * ) Notice: Subject to any disclaimer, the term of this patent is extended or adjusted under 35 U.S.C. 154(b) by 393 days.

(21) Appl. No.: 18/354,142

(22) Filed: Jul. 18, 2023

(65) Prior Publication Data
US 2025/0030740 A1     Jan. 23, 2025

(51) Int. Cl.
*H04L 29/06*     (2006.01)
*H04L 9/40*     (2022.01)

(52) U.S. Cl.
CPC ............. *H04L 63/20* (2013.01); *H04L 63/04* (2013.01)

(58) Field of Classification Search
None
See application file for complete search history.

(56) References Cited

U.S. PATENT DOCUMENTS

| | | | |
|---|---|---|---|
| 6,859,791 B1 * | 2/2005 | Spagna | H04L 69/329 705/317 |
| 6,983,371 B1 * | 1/2006 | Hurtado | H04L 9/321 726/28 |
| 2002/0002468 A1 * | 1/2002 | Spagna | H04L 63/0428 713/193 |
| 2003/0110130 A1 * | 6/2003 | Pelletier | G06Q 30/0207 705/50 |
| 2003/0135464 A1 * | 7/2003 | Mourad | G06Q 20/3821 707/E17.116 |
| 2006/0089912 A1 * | 4/2006 | Spagna | G06Q 20/40 705/51 |

(Continued)

OTHER PUBLICATIONS

Kageyama, Edson et al. An Experimental Peer-to-Peer E-mail System. 2008 11th IEEE International Conference on Computational Science and Engineering. https://ieeexplore.ieee.org/stamp/stamp.jsp?tp=&arnumber=4578234 (Year: 2008).*

(Continued)

*Primary Examiner* — Jeremiah L Avery
(74) *Attorney, Agent, or Firm* — Bradley Arant Boult Cummings LLP; Adam J. Thompson, Esq.

(57) ABSTRACT

Electronic destinations can be generated for tracking and monitoring electronic communications. Electronic destination can be generated and inserted into an electronic address pool. A rule for processing electronic communications can be generated and assigned to a generated electronic destination. The generated electronic destinations that have been inserted into the electronic address pool can be monitored for electronic communications. After receiving an electronic communication at a generated electronic address, the electronic communication can be process to determine if the electronic communication violates the assigned rule. If the electronic communication violates the assigned rule and is an unauthorized electronic communication, a record of the rule violation can be generated.

20 Claims, 4 Drawing Sheets

(56) References Cited

U.S. PATENT DOCUMENTS

| | | | |
|---|---|---|---|
| 2007/0156659 A1* | 7/2007 | Lim | G06F 21/6227 |
| 2008/0060051 A1* | 3/2008 | Lim | G06Q 10/10 |
| | | | 726/1 |
| 2010/0008500 A1* | 1/2010 | Lisanke | G06T 1/0021 |
| | | | 380/201 |
| 2012/0190386 A1* | 7/2012 | Anderson | G01S 19/14 |
| | | | 455/456.3 |
| 2016/0359872 A1* | 12/2016 | Yadav | H04L 63/1425 |
| 2017/0264640 A1* | 9/2017 | Narayanaswamy | G06F 16/951 |
| 2018/0054414 A1* | 2/2018 | LeVasseur | H04L 63/145 |
| 2019/0109713 A1* | 4/2019 | Clark | G06F 16/182 |
| 2020/0137115 A1* | 4/2020 | Janakiraman | H04L 43/028 |
| 2020/0162503 A1* | 5/2020 | Shurtleff | H04L 41/0894 |
| 2022/0201045 A1* | 6/2022 | Brannon | G06N 20/00 |
| 2023/0173395 A1* | 6/2023 | Cella | G06N 3/0455 |
| | | | 463/25 |
| 2023/0206329 A1* | 6/2023 | Cella | G06Q 20/0855 |
| 2023/0214925 A1* | 7/2023 | Cella | G06Q 30/06 |
| | | | 705/37 |

OTHER PUBLICATIONS

Pongchanchai, Matthamon et al. Countermeasure Against Spoofed E-mails Using Display Name as a User Authenticator. 2018 Seventh ICT International Student Project Conference (ICT-ISPC). https://ieeexplore.ieee.org/stamp/stamp.jsp?tp=&arnumber=8523883 (Year: 2018).*

Liu, Enze et al. Forward Pass: On the Security Implications of Email Forwarding Mechanism and Policy. 2023 IEEE 8th European Symposium on Security and Privacy (EuroS&P). https://ieeexplore.ieee.org/stamp/stamp.jsp?tp=&arnumber=10190492 (Year: 2023).*

Karim, Asif et al. A Comprehensive Survey for Intelligent Spam Email Detection. IEEE Access, vol. 7. https://ieeexplore.ieee.org/stamp/stamp.jsp?tp=&arnumber=8907831 (Year: 2019).*

* cited by examiner

ELECTRONIC COMMUNICATION LISTS MONITORING AND TRACKING

TECHNICAL FIELD

The present systems and processes relate to electronic communications sent to electronic destinations, including but not limited to, email address, phone numbers, and usernames or handles for messaging applications.

BACKGROUND

Many entities allow clients to subscribe to one or more electronic communication distribution lists. For example, clients might provide their email to receive promotional emails from a company. Clients might provide their phone number to receive offers via SMS messaging. However, many clients may choose to later unsubscribe from such subscription lists or have the clients address added to an unsubscribe or do not contact list. Even after a client unsubscribes from a subscription list, their contact information may be stored in a database. Even if their contact information is removed from the subscription list, their contact information may be accidentally added back to the subscription lists or included into a distribution of an electronic communication unintentionally. When electronic communication systems are changed or updated, subscribed lists and unsubscribed lists can be mixed up, added together, or conditional statements may be modified to send communications to recipients that do not wish to receive the communications.

Many jurisdictions have strict rules that require an entity to stop contacting a client if the client requests to be unsubscribed. Additionally, some email service providers have segmentation rules requiring entities to stop emailing clients if the client sends emails to spam or stops engaging with emails. Entities may want to segment invalid email addresses or phone numbers from valid ones. Some entities may keep separate subscription lists for different subsidiaries and may wish to segment these subscription lists. Moreover, third parties may steal subscription lists to use these subscription lists for their own promotional electronic communications. However, entities do not have a solution to track and monitor electronic communications that are sent to subscription list. Therefore, there is a long-felt but unresolved need for monitoring activity on electronic communication lists.

BRIEF SUMMARY OF THE DISCLOSURE

Briefly described, and according to one embodiment, aspects of the present disclosure generally relate to a system for generating and monitoring electronic destinations for violations of assigned rules. Electronic destinations can be email addresses, phone numbers, usernames or handles for messaging applications, or any other destination for electronic communications. The generated electronic destinations can be inserted into an electronic address pool of original electronic destinations. The electronic address pools can be lists of subscribed or unsubscribed original electronic destinations. The electronic address pools can be lists of authorized or non-authorized original electronic destinations (e.g., a list of recipients who have agreed or disagreed to receive electronic communications from a sender).

Rules can be generated and assigned to generated electronic destinations. The rule can be any rule for processing electronic communications received by the generated electronic destinations. As an example, the rule can be used to determine if an electronic communication received by a generated electronic destination is authorized. The rule can be a list of authorized senders or a list of non-authorized senders. After an electronic communication is received by a generated electronic address, the system can determine if the electronic communication violates a rule assigned to the generated electronic address. The metadata can be extracted and parsed from the electronic communication. The relevant metadata can be any metadata from an electronic communication, including the sender, other recipients, the subject, date and time of the message, the IP address of the sender, and metadata from the content from the electronic communication (e.g., links, images, texts).

The relevant metadata can be compared to the assigned rule to determine if the electronic communication violates the assigned rule. For example, a rule can include an authorized senders list for an electronic address pool of subscribers. If the rule is an authorized senders list, then the sender (e.g., the username or domain name) can be compared to the authorized senders list to determine if the sender is included in the authorized senders list. If the sender is excluded from the authorized senders list, then the received electronic communication can violate the rule and be an unauthorized electronic communication (e.g., an electronic communication sent by a sender not authorized to contact the subscribers in the electronic address pool). If the electronic communication violates the assigned rule, a record of the rule violation can be generated.

The above and further features of the disclosed systems and methods will be recognized from the following detailed descriptions and drawings of various embodiments.

BRIEF DESCRIPTION OF THE FIGURES

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Whether a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

Overview

Aspects of the present disclosure generally relate to a system for generating and monitoring electronic destinations for violations of assigned rules. The system can generate electronic destinations. Electronic destinations can be email addresses, phone numbers, usernames or handles for messaging applications, or any other destination for electronic communications. For example, the generated electronic destinations can be generated by creating email usernames at one or more domain names. The generated electronic destinations can be inserted into an electronic address pool of original electronic destinations. The term "original" is used herein to indicate electronic destinations in a set of electronic destinations other than the generated electronic destinations regardless of whether those electronic destinations were added or removed before or after the generated electronic destinations. Similar to the generated electronic destinations, the original electronic destinations can be email addresses, phone numbers, usernames or handles for messaging applications, or any other destination for electronic communications. Unlike the generated electronic destinations, the original electronic destinations can belong to users, clients, customers, subscribers, or unsubscribers (e.g., recipients of electronic communications). The electronic address pools can be lists of original electronic destinations stored in a data store or memory. The electronic address pools can be lists of subscribed or unsubscribed original electronic destinations. The electronic address pools can be lists of authorized or non-authorized original electronic destinations (e.g., a list of recipients who have agreed or disagreed to receive electronic communications from a sender).

The system can generate and assign the rules to generated electronic destinations. The rule can be any rule for processing electronic communications received by the generated electronic destinations. As an example, the system can process the rule to determine if an electronic communication received by a generated electronic destination is authorized. The rule can include a list of authorized senders or a list of non-authorized senders. The system can process the rule to change a subscribed electronic address pool to an unsubscribed address pool in response to receiving certain metadata. For example, a rule can be configured to cause the system to remove electronic destinations from a subscriber list if a recipient does not engage with electronic communications. As another example, a rule can be configured to cause the system to remove electronic destinations from a subscriber list and add the electronic destinations to an unsubscribe list if a received electronic communication is sent to a spam folder or an unsubscribe notification is received. As another example, a rule can specify that two different electronic address pools cannot receive the same electronic communications. For example, the rule can specify not to send electronic communications to original electronic destinations in certain locations. The rule can specify not to send electronic communications during a certain time of day.

The system can assign rules to generated electronic destinations or one or more electronic address pools. After a rule has been assigned to an electronic address pool, the generated electronic destinations that were inserted into the electronic address pool can be monitored to electronic communications. The generated electronic destinations can receive electronic communications that were received by the entire electronic address pool. By receiving the same electronic communications as the original electronic destinations in the electronic address pool, the generated electronic destinations can be monitored to determine if subscribed or unsubscribed list are being properly maintained and separated. For example, if a generated electronic destination in an unsubscribed electronic address pool receives an electronic communication that was intended for a subscription list, the electronic communication can indicate that at least some or all of the unsubscribed list is included in the subscribed list.

After an electronic communication is received by the system at a generated electronic address, the system can determine if the electronic communication violates a rule assigned to the generated electronic address. The system can extract and parse metadata from the electronic communication. The system can identify relevant metadata from the electronic communication. Relevant metadata can be any metadata from the received electronic communication that can be used to determine if the received electronic communication violated a rule. The system can identify the relevant metadata by applying the rules generated and assigned to the generated electronic destinations for which that received electronic communication were addressed. The metadata can be any metadata from an electronic communication, including the sender, other recipients, the subject, date and time of the message, the IP address of the sender, and metadata from the content from the electronic communication (e.g., links, images, texts).

The system can apply the assigned rule to the relevant metadata to determine if the electronic communication complies with or violates the assigned rule. For example, a rule can include an authorized senders list for an electronic address pool of subscribers. If the rule includes an authorized senders list, then the system can compare the sender (e.g., the username or domain name) to the authorized senders list to determine if the sender is included in the authorized senders list. If the sender is excluded from the authorized senders list, then the system can determine that the received electronic communication violates the rule and is an unauthorized electronic communication (e.g., an electronic communication sent by a sender not authorized to contact the subscribers in the electronic address pool). If the electronic communication violates the assigned rule, the system can generate a record of the rule violation.

The system can receive metadata from service providers for original electronic destinations. The metadata can include an unsubscribed or non-delivered notification. The metadata can indicate that the electronic communication was added to spam or junk. The system can modify the rules assigned to the electronic communications in response to the metadata. The system can add flags to electronic communications displayed in a table. For example, a flag can be added to a sender of an electronic communication to indicate that the sender should be added to the unauthorized sender list. The assigned rule can be modified in response to the flag. If a rule has not been assigned to the associated generated electronic destinations, a rule can be created.

Exemplary Embodiments

Figure 1:
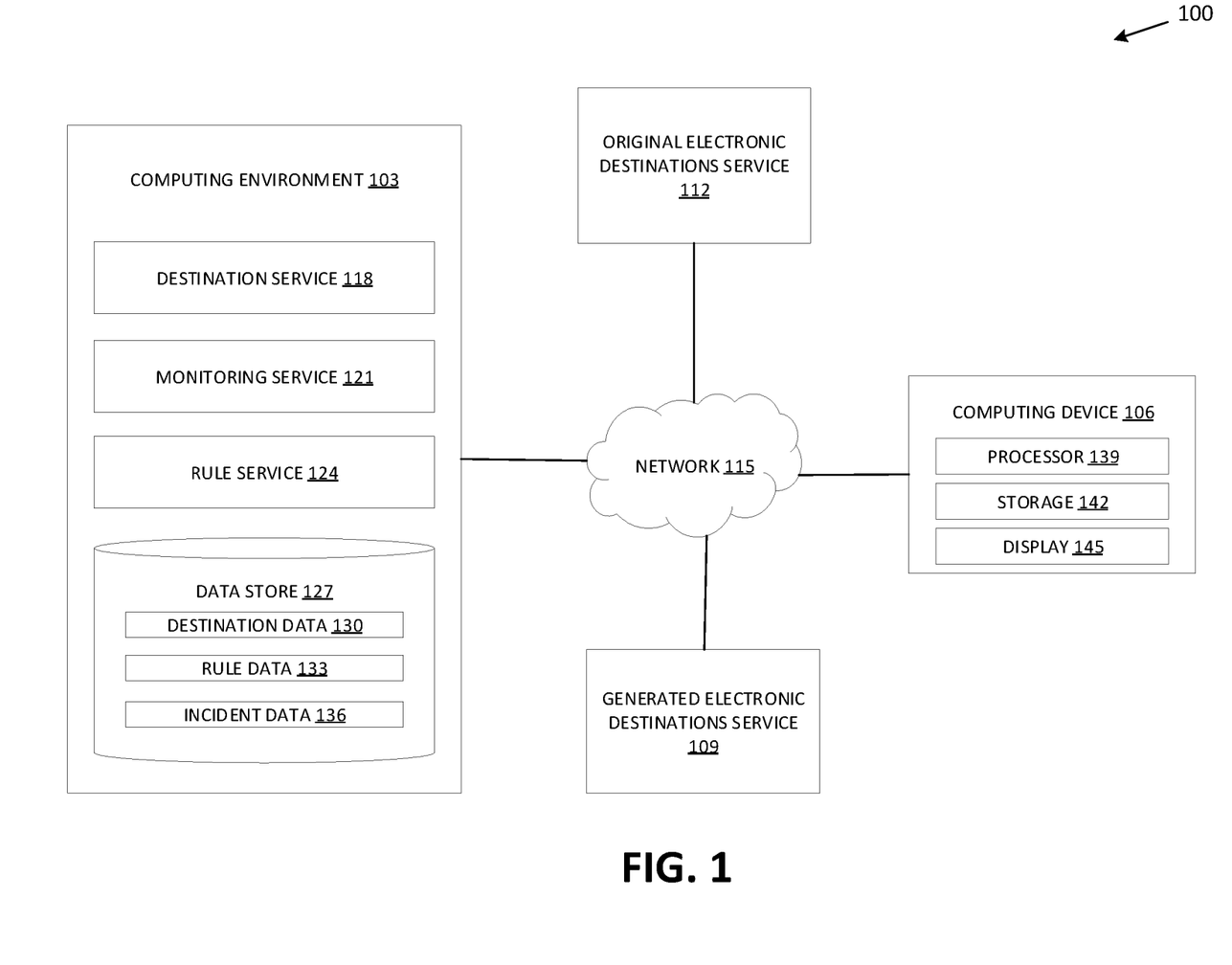
FIG. 1 illustrates an exemplary networked environment for the disclosed system according to various embodiments of the present disclosure.

Referring now to the figures, for the purposes of example and explanation of the fundamental processes and components of the disclosed systems and processes, reference is made to FIG. 1, which illustrates the exemplary networked environment 100 for the generated electronic destination system. As will be understood and appreciated, the exemplary networked environment 100 shown in FIG. 1 represents merely one approach or embodiment of the present system, and other aspects are used according to various embodiments of the present system.

FIG. 1 shows an exemplary networked environment 100 for the generated electronic destination system. Exemplary networked environment 100 can include, but is not limited to, a computing environment 103 connected to one or more computing devices 106, one or more generated electronic destinations services 109, and one or more original electronic destination services 112 over a network 115.

The elements of the computing environment 103 can be provided via a plurality of computing devices that may be arranged, for example, in one or more server banks or computer banks or other arrangements. Such computing devices can be located in a single installation or may be distributed among many different geographical locations. For example, the computing environment 103 can include a plurality of computing devices that together may include a hosted computing resource, a grid computing resource, or any other distributed computing arrangement. In some cases, the computing environment 103 can correspond to an elastic computing resource where the allotted capacity of processing, network, storage, or other computing-related resources may vary over time. Regardless, the computing environment 103 can include one or more processors and memory having instructions stored thereon that, when executed by the one or more processors, cause the computing environment 103 to perform one, some, or all of the actions, methods, steps, or functionalities provided herein.

The computing environment 103 can include a destination data service 118, a monitoring service 121, a rule service 124, and a data store 127. The destination data service 118, the monitoring service 121, and the rule service 124 can correspond to one or more software executables that can be executed by the computing environment 103 to perform the functionality described herein. While the destination data service 118, the monitoring service 121, and the rule service 124 are described as different services, it can be appreciated that the functionality of these services can be implemented in one or more different services executed in the computing environment 103. Various data can be stored in the data store 127, including but not limited to, destination data 130, rule data 133, and incident data 136.

The destination service 118 can generate electronic destinations and insert the generated electronic destinations into an electronic address pool. The generated electronic destinations can be email addresses, phone numbers, usernames or handles for messaging applications, or any other destination for electronic communications. For example, the destination service 118 can generate the electronic destinations by creating email usernames at one or more privately owned domain names. The destination service 118 can store the generated electronic destinations as destination data 130. The electronic address pools can include a list of original electronic destinations. The original electronic destinations can include email addresses, phone numbers, usernames or handles for messaging applications, or any other destination for electronic communications. The original electronic destinations can belong to or be associated with users, clients, customers, subscribers, or unsubscribers (e.g., recipients of electronic communications). For example, the original electronic addresses can belong to customers who subscribed to an email list to receive electronic communications for marketing purposes. The electronic address pools can include lists of subscribed or unsubscribed original electronic destinations. The electronic address pools can include lists of authorized or non-authorized original electronic destinations (e.g., a list of recipients who have agreed or disagreed to receive electronic communications from a sender). The destination service 118 can insert the generated electronic destinations to the electronic address pool (e.g., add the generated electronic destinations to a list of original electronic destinations) at random or periodic intervals.

The destination service 118 can also receive metadata from the original electronic destination service 112. The original electronic destination service 112 can be any service that receives electronic communications for the original electronic destinations. For example, the original electronic destinations service 112 can be an email service provider, internet service provider, mobile cellphone provider, or application service provider. The original electronic destination service 112 can send metadata related to electronic communications received by the original electronic destinations. For example, the original electronic destinations can be the destination for electronic communications because the original electronic destinations are listed in an electronic address pool and the electronic communication was sent to all the electronic destinations in the electronic address pool (e.g., both generated electronic destinations and original electronic destinations).

The original electronic destination service 112 can send any metadata related to electronic communications received by the original electronic destinations. For example, metadata can include a notification from the original electronic destination service 112 that the electronic communication was added or sent to spam or junk. For example, the metadata can include a notification that the recipient of the electronic communication reported the electronic communication. The metadata can include an unsubscribe notification (e.g., a notification indicating that the recipient wishes to unsubscribe from electronic communications). The metadata can include a non-deliverable notification for a specific original electronic destination. The metadata can be related to recipient engagement. For example, the metadata can indicate that the recipient has not engaged with the electronic communication (e.g., the recipient has not clicked any links contained in the electronic communication). The metadata can indicate that the recipient has not engage with any electronic communications during a predefined period of time. The metadata can indicate that the recipient has read or opened or accessed the electronic communication.

The monitoring service 121 can monitor the generated electronic destinations for electronic communications. All of the electronic communications received by the generated electronic destinations can be routed to a single inbox or folder or storage location for monitoring and analysis by the monitoring service 121. Each electronic address pool can have a designated inbox. The monitoring service 121 can store the electronic communications received by the generated electronic destinations as destination data 130.

The monitoring service 121 can receive a notice that an electronic communication has been received by the generated electronic destinations service 109. The generated electronic destinations service 109 can be any service that receives electronic communications for the generated electronic destinations. For example, the generated electronic destinations service 109 can include an email service provider, internet service provider, mobile cellphone provider, application service provider, or another service within the computing environment 103.

The rule service 124 can generate or create rules and assign the rules to electronic communications. The rule can be any rule for processing electronic communications received by the generated electronic destinations. As an example, the rule service 124 can use the rule to determine if an electronic communication received by a generated electronic destination is authorized. The rule can include a list of authorized senders or a list of non-authorized senders. The rule can specify to change a subscribed electronic address pool to an unsubscribed address pool in response to receiving certain metadata. For example, a rule can specify to remove electronic destinations from a subscriber list if a recipient does not engage with electronic communications. As another example, a rule can specify to remove electronic destinations from a subscriber list and add the electronic destinations to an unsubscribe list if a received electronic communication is sent to a spam folder or an unsubscribe notification is received. As another example, a rule can specify that two different electronic address pools cannot receive the same electronic communications. For example, the rule can specify to not send electronic communications to original electronic destinations in certain locations. The rule can specify to not send electronic communications during a certain time of day. The rule can be saved as rule data 133.

The rule service 124 can assign rules to generated electronic addresses. The rule service 124 can assign a rule to one or more generated electronic destinations. The rule service 124 can assign multiple rules to one or more generated electronic destinations. The rule service 124 can assign a rule to an electronic address pool.

The rule service 124 can determine if an electronic communication received by a generated electronic destination violates an assigned rule. The rule service 124 can extract and parse metadata from the electronic communication to identify the relevant metadata. Relevant metadata can include any metadata from the received electronic communication that can be used to determine if the received electronic communication violated a rule. The rule service 124 can retrieve and determine the relevant metadata dependent on the rules generated and assigned to the generated electronic destinations that received the received electronic communication. The metadata can include any metadata from an electronic communication, including the sender, other recipients, the subject, date and time of the message, the IP address of the sender, and metadata from the content from the electronic communication (e.g., links, images, texts).

The rule service 124 can compare the relevant metadata to the rule to determine if the electronic communication violates the rule. For example, a rule include be an authorized senders list for an electronic address pool of subscribers. If the rule is an authorized senders list, then the sender (e.g., the username or domain name) can be compared to the authorized senders list to determine if the sender is included in the authorized senders list. If the sender is excluded from the authorized senders list, then the rule service 124 determine that the received electronic communication violates the rule and the received electronic communication is an unauthorized electronic communication (e.g., an electronic communication sent by a sender not authorized to contact the subscribers in the electronic address pool). The rule service 124 can determine an incident associated with the rule violation. If an unauthorized electronic communication is sent to a generated electronic destination in a subscribed electronic address pool, then the electronic address pool could have been taken by a third party without authorization. As another example, a rule can specify that electronic communications can only be received by a first electronic address pool, but not a second electronic address pool (e.g., the first electronic address pool can be a subscribers list and the second electronic address pool can be an unsubscribed list). If a generated electronic destination in the second electronic address pool receives an electronic communication sent to the first electronic address pool, then the electronic destinations from the second electronic address pool could have been improperly added to the first address pool.

The rule service 124 can generate a record of the violation and display all of the electronic communications in a feed, dashboard, or table. For example, the rule service 124 can display all of the electronic communications received by an electronic address pool. For example, the rule service 124 can display all of the unauthorized electronic communications in a flagged senders table. The rule service 124 can send a notice of the rule violation to a client or user.

The rule service 124 can modify existing rules or create new rule in response to receiving metadata. For example, the rule service 124 can display the electronic communications received at an electronic address pool in a table. The rule service 124 can add a flag to a sender of an electronic communication to indicate that the sender should be added to the unauthorized sender list. The rule service 124 can modify a rule based on the flag. The rule service 124 can modify rules based on the received metadata from the original electronic destinations service 112. For example, the original electronic destinations service 112 can send a notification indicating that a recipient of an electronic communication sent the electronic communication to spam. The rule service 124 can modify the assigned rule based on the notification.

According to various embodiments, computing device 106 can be any device capable of accessing network 115 including, but not limited to, a computer, smartphone, tablets, or other device. Computing device 106 can include one or more processors 139 and storage 142. Computing device 106 can include a display 145 on which various user interfaces can be rendered to allow users to configure, monitor, control, and command various functions of networked environment 100. In various embodiments, computing device 106 can include multiple computing devices. The computing device 106 can include one or more processors and memory having instructions stored thereon that, when executed by the one or more processors, cause the computing device 106 to perform one, some, or all of the actions, methods, steps, or functionalities provided herein.

The network 115 includes, for example, the Internet, intranets, extranets, wide area networks (WANs), local area networks (LANs), wired networks, wireless networks, or other suitable networks, etc., or any combination of two or more such networks.

Figure 2:
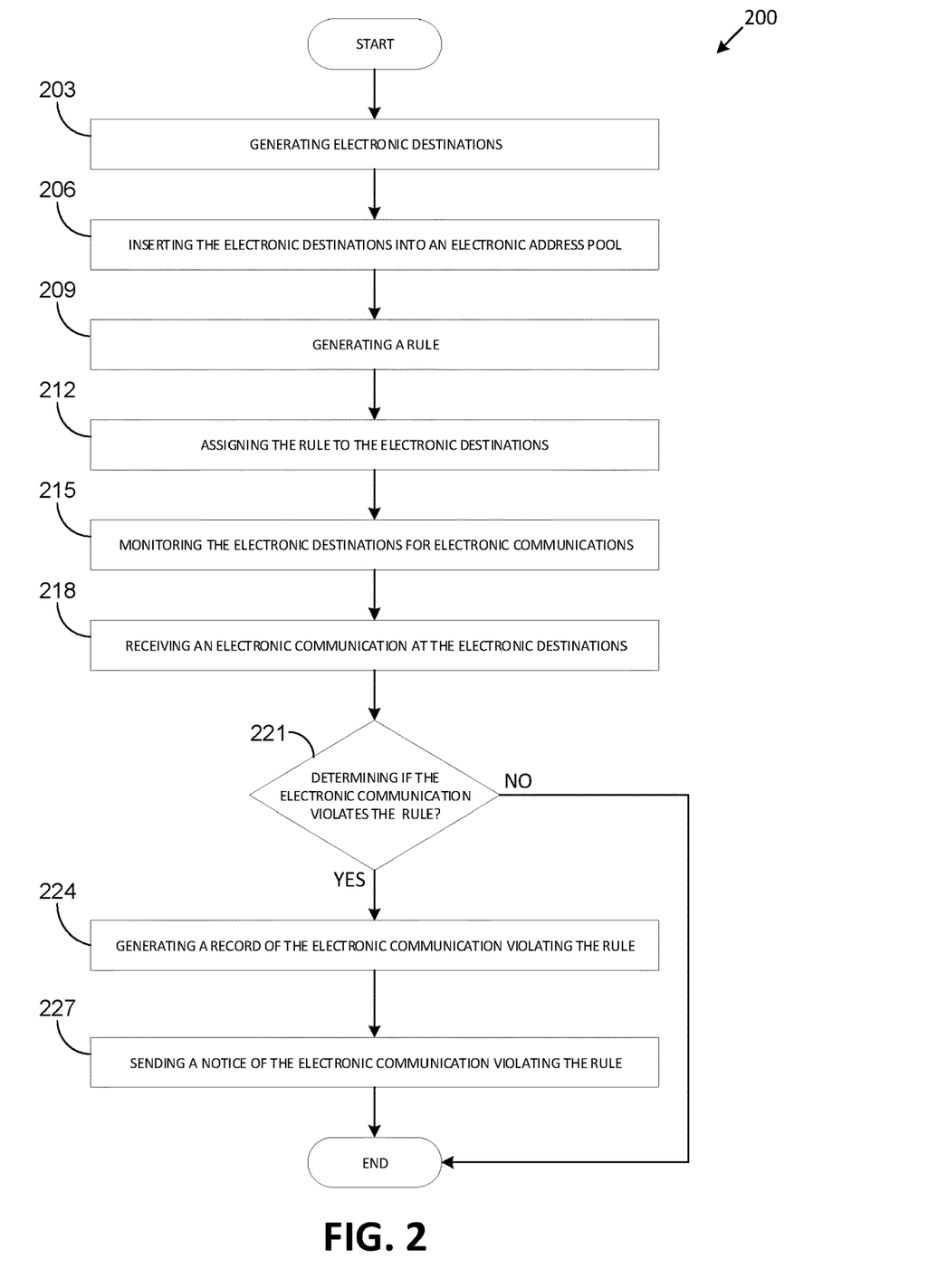
FIG. 2 illustrates an exemplary overall process for the disclosed system according to various embodiments of the present disclosure.

Referring now to FIG. 2, FIG. 2 shows an exemplary, high-level overview process 200 according to one embodiment of the present disclosure. As will be understood by one having ordinary skill in the art, the steps and processes shown in FIG. 2-4 may operate concurrently and continuously, are generally asynchronous and independent, can be performed in part or in whole by a combination of one or more of the computing environment 103 and computing devices 106, and are not necessarily performed in the order shown.

At step 203, process 200 can include generating electronic destinations. The destination service 118 can generate the electronic destinations. The generated electronic destinations can include email addresses, phone numbers, usernames or handles for messaging applications, or any other destination for electronic communications. For example, the destination service 118 can generate the generated electronic destinations by creating email usernames at one or more privately owned domain names. The destination service 118 can store the generated electronic destinations as destination data 130.

The number of generated electronic destinations can depend on the size of the electronic address pool. The number of generated electronic destinations can be sufficient to be distributed among the original electronic addresses in the electronic address pool. In some embodiments, the destination service 118 can identify a quantity of configured minimum, maximum, and/or specified segment size for segmenting electronic addresses and use the quantity to determine a number of electronic destinations to generate. The destination service 118 can distribute the generated electronic destinations in the electronic address pool such that, if the electronic address pool was to be segmented, split up, or divided, each individual portion of the electronic address pool could include a generated electronic address. As an example, an electronic address pool can include a list of email addresses associated with subscribers or recipients. The electronic address pool can include 500 original electronic addresses, where each original electronic address can represent an email address for a subscriber. For this electronic pool, the destination service 118 can generate a number of generated electronic destinations equal to or less than the size of the electronic address pool (e.g., equal to or less than 500 generated electronic destinations). In another example, the electronic address pool can include 100,000 original electronic addresses and the number of generated electronic destinations can be equal to or less than the size of the electronic address pool (e.g., equal to or less than 100,000 generated electronic destinations).

At step 206, process 200 can include inserting the generated electronic destinations into one or more electronic address pools. The destination service 118 can insert the generated electronic destinations into the one or more electronic address pools. The electronic address pools can be subscriber lists or unsubscribe lists. For example, if the electronic destinations are emails, the electronic address pools can be bounce lists (e.g., a list of email addresses that can be non-deliverable addresses), complainer lists (e.g., a list of email addresses that sent previous electronic communications to a spam or junk folder), unengaged lists (e.g., a list of email addresses that have not engaged with an electronic communication in a predefined period of time), hygiene lists (e.g., a list of invalid email addresses), spamtrap lists (e.g., a list of email addresses used by an internet service provider to monitor and identify senders who harvest email addresses for spamming purposes), jurisdictional lists (e.g., a list of email addresses for subscribers living in the same jurisdiction or jurisdictions with similar telecommunications regulations), or segmentation lists (e.g., a list of email addresses that are divided by internet service providers, email service provider, date of last engagement). For example, if the electronic destinations are phone numbers or another type of electronic address, the electronic address pool can be invalid lists (e.g., a list of invalid electronic destinations), a complainers list (e.g., a list of electronic destinations that sent previous electronic communications to a spam or junk folder), or reporter list (e.g., a list of electronic destinations that have previously reported previous electronic communications as spam or violating a policy, guidelines, or terms of use).

The destination service 118 can insert the generated electronic destinations into the electronic address pool depending on the format of the pool. The electronic address pool can be stored in a database, in a data archive, as a flat file, as a CSV file or spreadsheet file type or as some other type of data structure. The destination service 118 can extract or export the electronic address pool from a data store, such as destination data 130. For example, if the electronic address pool is a CSV file, the destination service 118 can insert the generated electronic destinations into the CSV file at periodic or random intervals. For example, if the electronic address pool is a type of a data structure in a cloud-based database, the generated electronic destinations can inserted into the data structure at periodic or random intervals. The electronic address pool can be stored as destination data 130.

At step 209, process 200 can include generating at least one rule for processing electronic messages or communications. The rule service 124 can generate the rule. The rule can be any rule for processing electronic communications received by the generated electronic destinations. As an example, the rule service 124 process a rule to determine if an electronic communication received by a generated electronic destination is authorized. The rule can include a list of authorized senders or a list of non-authorized senders. The rule can specify to change a designation (e.g., subscribed or unsubscribed) associated with an electronic address pool in response to an action or receiving a notification. For example, a rule can specify to remove electronic destinations from a subscriber list if a recipient does not engage with a received electronic communication. As another example, a rule can specify to remove electronic destinations from a subscriber list and add the electronic destinations to an unsubscribe list if a received electronic communication is sent to a spam folder or an unsubscribe notification is received. As another example, a rule can specify that two different electronic address pools cannot receive the same electronic communications. The rule can be saved as rule data 133.

At step 212, process 200 can include assigning a rule to one or more electronic destinations. The rule service 124 can assign a rule to the one or more electronic destinations. Multiple rules can be assigned to a set of electronic destinations, including a set of generated electronic destinations. One or more rules can be assigned to an electronic address pool that has been injected with generated electronic destinations at step 206.

At step 215, process 200 can include monitoring the generated electronic destinations for electronic communications or messages. The monitoring service 121 can monitor the generated electronic destinations for electronic communications or messages. Once a rule has been assigned to a set of generated electronic destinations or an electronic address pool that has been injected with generated electronic destinations, all of the electronic communications received by the generated electronic destinations can be routed to a single inbox for monitoring. The single inbox can be monitored for any electronic communications received by one or more of the generated electronic destinations.

At step 218, process 200 can include receiving an electronic communication or message at one or more of the generated electronic destinations. The monitoring service 121 can receive a notice that an electronic communication has been received by the generated electronic destinations service 109. As an example, the generated electronic destinations can be email addresses and the electronic communications can be emails. As another example, the generated electronic destinations can be phone numbers and the electronic communications can be text messages. As another example, the generated electronic destinations can be usernames or handles for messaging applications and the electronic communications can be messages received via the messaging applications.

A particular electronic communication can be received by a one or multiple generated electronic destinations. For example, multiple generated electronic destinations can be inserted into an electronic address pool at step 206. A particular electronic communication can be received by a single generated electronic destination out of the multiple generated electronic destinations inserted into an electronic address pool. A particular electronic communication can be received by all or some of the generated electronic destinations inserted into an electronic address pool. A particular electronic communication can be received by generated electronic destinations inserted across multiple electronic address pools.

At step 221, process 200 can include determining if the electronic communication received by the one or more generated electronic destinations violates the rule assigned at step 212. The rule service 124 can determine if the electronic communication received by the one or more generated electronic destinations violates the assigned rule. Determining if the electronic communication violates the assigned rule can include extracting and parsing the metadata from the electronic communication. The sender and other information (e.g., date and time of message, content, other recipients) can be identified from the metadata. The identified metadata can be compared to the rule to determine if the electronic communication violates the rule. If the electronic communication is determined to have violated the rule, the electronic communication can be determined to be an unauthorized electronic communication. Step 221 will be discussed further herein with reference to FIG. 3.

If the electronic communication is determined to violate the rule, then process 200 can proceed to step 224. If the electronic communication is determined to not violate the rule, then process 200 can end.

At step 224, process 200 can include generating a record of the electronic communication violating the rule. The rule service 124 can generate the record of the electronic communication violating the rule. A record can be generated of the electronic communication being an unauthorized electronic communication. The record can include the sender and other information (e.g., date and time of message, content, other recipients) identified from the metadata at step 221. The record can include the rule violated and related details (e.g., if the electronic communication was received by an unsubscribe list, if the electronic communication was received by an unengaged list, if the electronic communication was an unauthorized electronic communication). The record can be displayed in a feed or dashboard or in a table displaying other incidents of electronic communications violating the rule. The record can be displayed in a table displaying other electronic communications sent by unauthorized or flagged senders. The record can be stored as incident data 136.

At step 227, process 200 can include sending a notice that an electronic communication violated a rule to a client. The rule service 124 can send a notice to a client that an electronic communication violated a rule. The notice can include the same information as the record or a summary of the record. The notice can include prompts for the client to take an action related to the electronic communication. The notice can be sent to the client via email, text, or as a notification from an application.

Figure 3:
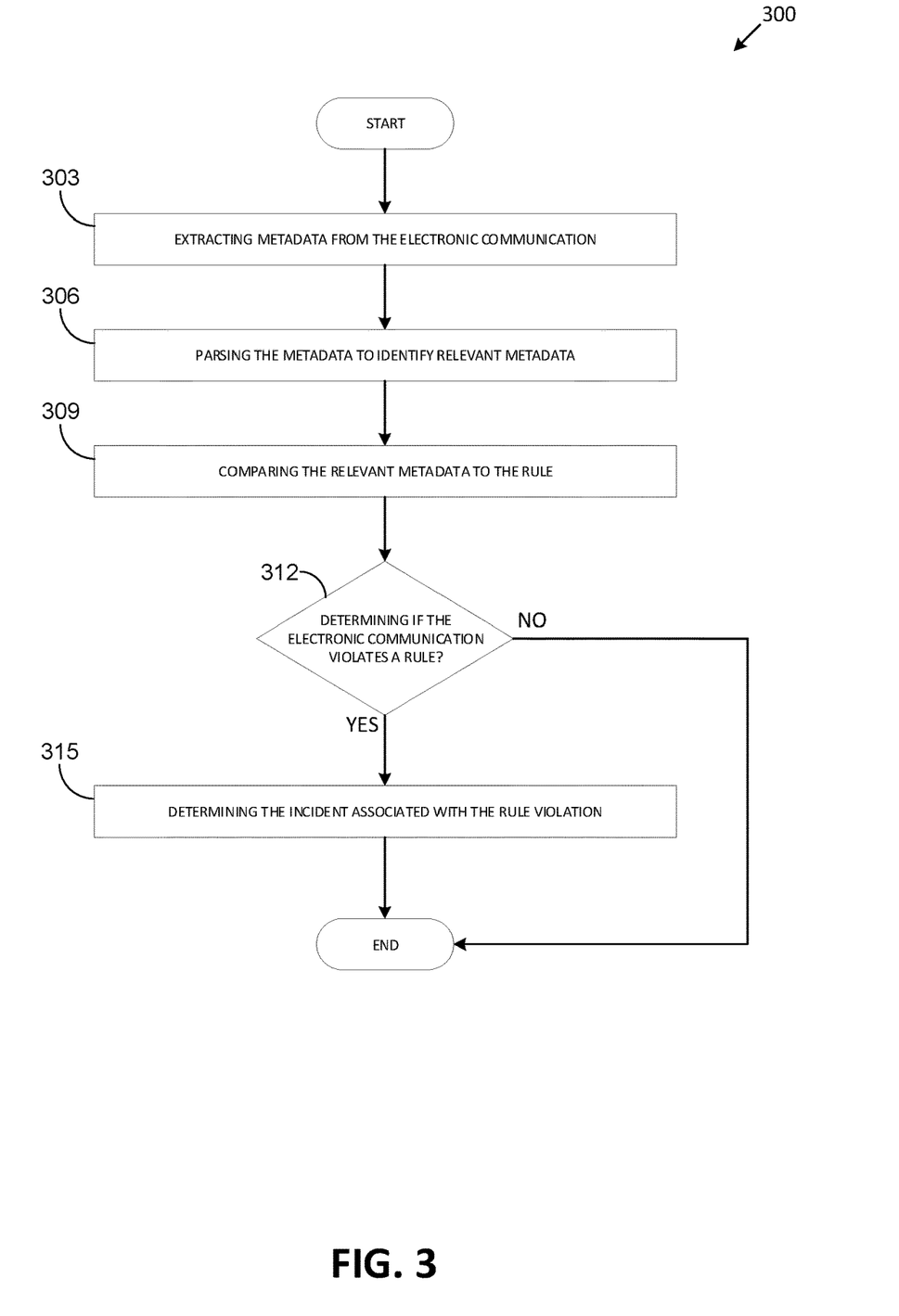
FIG. 3 illustrates an exemplary process for determining if an electronic communication received by a generated electronic destination violates an assigned rule according to various embodiments of the present disclosure.

Referring now to FIG. 3, process 300 shows an exemplary process for determining if an electronic communication received by a generated electronic destination violates an assigned rule. Process 300 can be performed entirely or partially be the rule service 124. At step 303, process 300 can include extracting metadata from the received electronic communication. The rule service 124 can extract the metadata from the received electronic communication.

At step 306, process 300 can include parsing the extracted metadata to identify relevant metadata from the received electronic communication. The rule service 124 can parse the extract metadata to identify relevant metadata. Relevant metadata can be any metadata from the received electronic communication that can be used to determine if the received electronic communication violated a rule. The relevant metadata can depend on the rules generated and assigned to the generated electronic destinations that received the received electronic communication. For example, if the rule includes a list of authorized senders or a list of non-authorized senders, then the rule service 124 can determine relevant metadata as the sender, including the sender's name and their domain. For example, if the rule is to not send electronic communications to a certain electronic address pool, then the rule service 124 can determine the relevant metadata as an IP address for the sender of the received electronic communication. As another example, if the rule is to not send electronic communications during a certain time of day to a certain electronic address pool, then the rule service 124 can determine the relevant metadata to be the time that the received electronic communication was sent.

At step 309, process 300 can include comparing the relevant metadata to the assigned rule. The rule service 124 can compare the relevant metadata to the assigned rule. For example, a rule can include an authorized senders list for an electronic address pool of subscribers. If the rule is an authorized senders list, then the rule service 124 can compare the sender (e.g., the username or domain name) to the authorized senders list to determine if the sender is included in the authorized senders list. If the sender is excluded from the authorized senders list, then the rule service 124 can determine that the received electronic communication violates the rule and the received electronic communication is an unauthorized electronic communication (e.g., an electronic communication sent by a sender not authorized to contact the subscribers in the electronic address pool). For example, the authorized senders list can include a list of domains authorized to send electronic communications to the electronic address pool of subscribers. The rule service 124 can compare the sender's domain to the authorized senders list. If the sender's domain is excluded from the authorized senders list (e.g., the domain is associated with a company not authorized to send electronic communications to the electronic address pool of subscribers), the rule service 124 can determine the received electronic communication violates the rule.

As another example, a rule can include an unauthorized senders list for an unsubscribed electronic address pool (e.g., the original electronic destinations in the electronic address pool correspond to users who have unsubscribed from electronic communications). If the rule is an unauthorized senders list, then the rule service 124 can compare the sender (e.g., the username or domain name) to the unauthorized senders list to determine if the sender is included in the unauthorized senders list. If the sender is included in the unauthorized senders list, then the rule service 124 can determine that the received electronic communication violates the rule and that the received electronic communication is an unauthorized electronic communication (e.g., an electronic communication sent by a sender not authorized to contact the users in the unsubscribed electronic address pool).

As another example, a rule can specify that electronic communications can only be received by a first electronic address pool, but not a second electronic address pool. If an electronic communication sent to the first electronic address pool and is received by a generated electronic destination, the rule service 124 can compare the generated electronic destination to both the first and second electronic address pools. If the generated electronic destination is included in the second electronic address pool, but not the first electronic address pool, then the rule service 124 can determine the received electronic communication violates the rule.

At step 312, process 200 can include determining if the received electronic communication violates the assigned rule based on the comparison performed at step 309. The rule service 124 can determine if the received electronic communication violates the assigned rule based on the comparison performed at step 309. If the comparison performed at step 309 indicates that the received electronic communication violates the assigned rule, then process 200 can proceed to step 315. If the comparison performed at step 309 indicates that the received electronic communication does not violate the assigned rule, then process 200 can end.

At step 315, process 300 can include determining the incident associated with the rule violation. For example, a rule can include an authorized senders list that has been assigned to an electronic address pool (e.g., a subscribers electronic address pool). If an unauthorized electronic communication is received by the generated electronic destinations in the electronic address pool, then the rule service 124 may determine the electronic address pool may have been taken by a third party without authorization. As another example, a rule can specify that electronic communications can only be received by a first electronic address pool, but not a second electronic address pool (e.g., the first electronic address pool can be a subscribers list and the second electronic address pool can be an unsubscribed list). If a generated electronic destination in the second electronic address pool receives an electronic communication sent to the first electronic address pool, then the rule service 124 may determine that the electronic destinations from the second electronic address pool have been improperly added to the first address pool.

Figure 4:
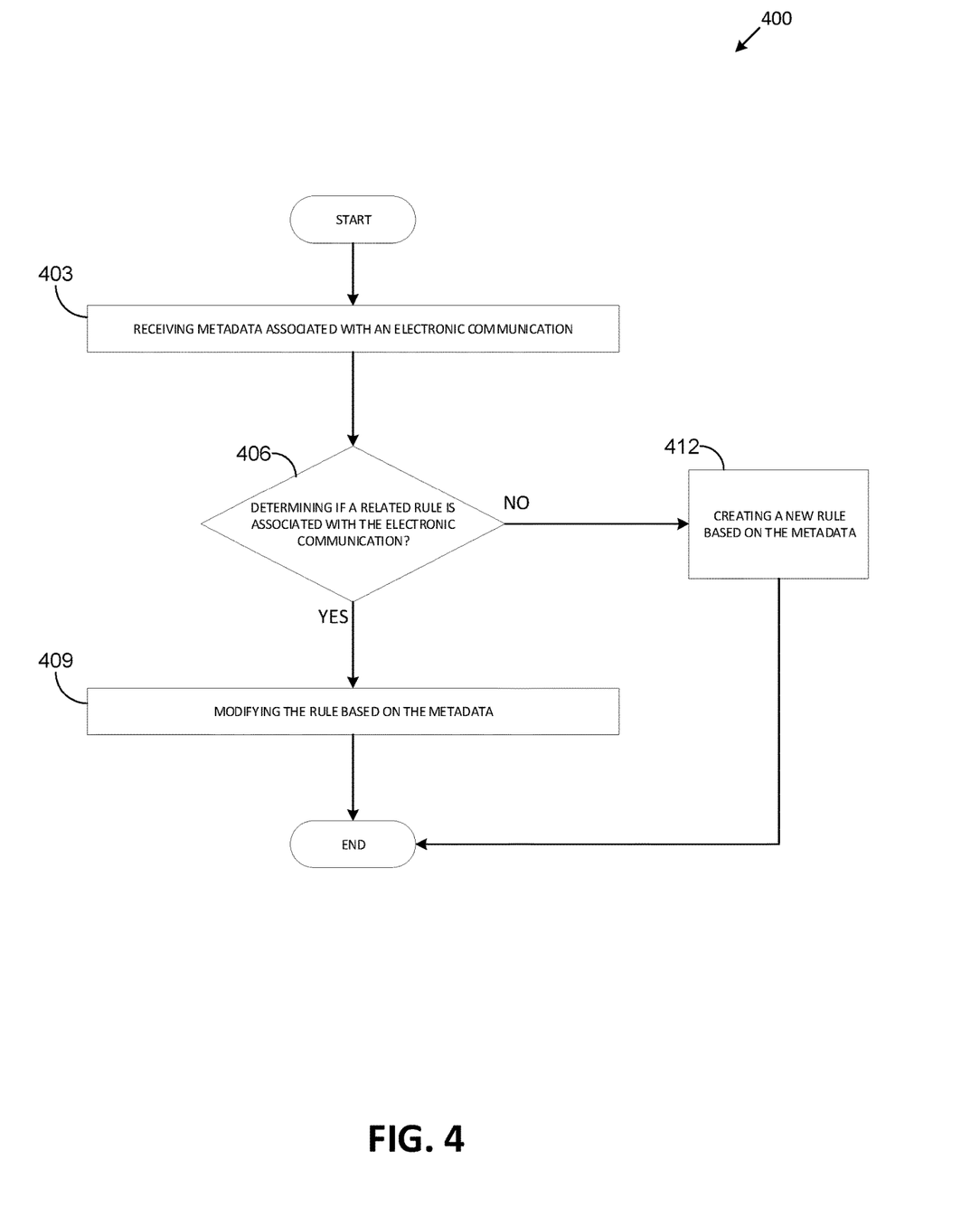
FIG. 4 illustrates an exemplary process for rule management according to various embodiments of the present disclosure.

Referring now to FIG. 4, process 400 shows an exemplary process for modifying a rule or creating a new rule. Process 400 can be performed entirely or partially be the rule service 124. At step 403, process 400 can include receiving metadata associated with an electronic communication. The metadata associated with an electronic communication can be a flag added to an electronic communications received by an electronic address pool. For example, all of the electronic communications received by an electronic address pool can be displayed in a feed, dashboard, or table. An electronic communication can be flagged if the feed indicates that the electronic communication did not violate a rule or violated the incorrect rule.

The metadata associated with an electronic communication can be metadata from a service provider for an original electronic destination that received the electronic communication. For example, the metadata can be a notification from the service provider that the electronic communication was added or reported as spam or junk. For example, the metadata can be a non-delivered notification in response to sending an electronic communication to an electronic address pool. The metadata associated with an electronic communication can be metadata related to recipient engagement. For example, the metadata can indicate that the recipient has not engaged with any electronic communications sent to the electronic address pool during a predefined period of time.

At step 406, process 400 can include determining if a related rule is associated with the electronic communication (e.g., the electronic communication associated with the received metadata). The rule service 124 can determine if a related rule is associated with the electronic communication. A rule can be a related rule if the received metadata can be used to determine if the electronic communication violated the rule. For example, if the received metadata is a flag on a sender, then a related rule can include an authorized sender list or non-authorized sender list. As another example, if the received metadata is a non-delivered notification or a notification that an electronic communication was added or reported as junk, the related rule can specify to change a designation (e.g., subscribed or unsubscribed) associated with an electronic address pool.

A related rule can be associated with the electronic communication if the related rule is assigned to the generated electronic destinations or electronic address pool that received the electronic communication. If a related rule is associated with the electronic communication (e.g., the electronic communication associated with the received metadata), then process 400 proceeds to step 409.

The electronic communication (e.g., the electronic communication associated with the received metadata) can have no related rule. If the electronic communication has no related rule, then no related rule is assigned to the generated electronic destinations or electronic address pool that received the electronic communication. If the electronic communication does not have a related rule, then process 400 proceeds to step 412.

At step 409, process 400 can include modifying the related rule based on the received metadata. For example, the rule service 124 can modify the related rule based on the received metadata. In one example, if the received metadata is a flag added to a sender on an authorized sender list on a dashboard or feed, the rule can be modified to remove the sender from the authorized sender list or add the sender to a non-authorized sender list. For example, if the received metadata is a non-delivered notification for the associated electronic communication, the rule can be modified from an authorized sender list (e.g., for a subscriber electronic address pool) to a non-authorized sender list (e.g., for an unsubscribed or invalid electronic address pool). As another example, if the received metadata is a notification or indication that a recipient has not engaged with any electronic communications within a predefined period of time, the rule can be modified to remove the original electronic destination for the recipient from a subscriber electronic address pool to an unsubscribed address pool. As another example, if the received metadata is a notification from the service provider that the recipient sent the electronic communication to a spam or junk folder or reported the electronic communication, the rule can be modified from to remove the original electronic destination of the recipient from a subscriber electronic address pool to an unsubscribed address pool. The rule service can store the modified rule as rule data 133.

At step 412, process 400 can include creating a new rule based on the received metadata. For example, if the received metadata is a flag added to the sender of the electronic communication, then a new rule can include created to add the sender to the authorized sender list or a non-authorized sender list. As another example, if the received metadata is a notification or indication that a recipient has not engaged with any electronic communications within a predefined period of time, then the rule service 124 can create a new rule to add the original electronic destination of the recipient to an unsubscribed address pool. After the new rule is created, the rule service 124 can assign the new rule to one or more generated electronic destinations or electronic address pools. The rule service 124 can store the new rule as rule data 133. As will be understood by those having ordinary skill in the art, any of the rules described herein can be capable of modification at step 409 or creation at step 412.

From the foregoing, it will be understood that various aspects of the processes described herein are software processes that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media which can be accessed by a computer, or downloadable through communication networks. By way of example, and not limitation, such computer-readable media can comprise various forms of data storage devices or media such as RAM, ROM, flash memory, EEPROM, CD-ROM, DVD, or other optical disk storage, magnetic disk storage, solid state drives (SSDs) or other data storage devices, any type of removable non-volatile memories such as secure digital (SD), flash memory, memory stick, etc., or any other medium which can be used to carry or store computer program code in the form of computer-executable instructions or data structures and which can be accessed by a general purpose computer, special purpose computer, specially-configured computer, mobile device, etc. The computer-readable media or mediums can be non-transitory.

When information is transferred or provided over a network or another communications connection (either hardwired, wireless, or a combination of hardwired or wireless) to a computer, the computer properly views the connection as a computer-readable medium. Thus, any such connection is properly termed and considered a computer-readable medium. Combinations of the above should also be included within the scope of computer-readable media. Computer-executable instructions comprise, for example, instructions and data which cause a general purpose computer, special purpose computer, or special purpose processing device such as a mobile device processor to perform one specific function or a group of functions.

Those skilled in the art will understand the features and aspects of a suitable computing environment in which aspects of the disclosure may be implemented. Although not required, some of the embodiments of the claimed systems may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represent examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multi-processor systems, microprocessor-based or programmable consumer electronics, networked PCs, minicomputers, mainframe computers, and the like. Embodiments of the claimed system are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically comprises one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that effects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the systems are embodied. The logical connections between computers include a local area network (LAN), a wide area network (WAN), virtual networks (WAN or LAN), and wireless LAN (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the system is connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

Clause 1. A system, comprising: a data store; and at least one computing device in communication with the data store, wherein the at least one computing device is configured to: generate a plurality of electronic destinations configured to be routed to any one of the at least one computing device; insert the plurality of electronic destinations into an electronic address pool; generate at least one rule for processing of electronic messages; assign the at least one rule to the plurality of electronic destinations; monitor the plurality of electronic destinations for electronic communications; in response to receiving an electronic communication, process the electronic communication using the at least one rule to determine whether the electronic communication is unauthorized; and in response to the electronic communication being unauthorized, generate a record of the electronic communication being unauthorized.

Clause 2. The system of clause 1 or any other clause herein, wherein the at least one computing device is further configured to generate the record of the electronic communication being unauthorized by adding sender information of the electronic communication to a flagged sender table.

Clause 3. The system of clause 1 or any other clause herein, wherein the at least one computing device is further configured to determine that the electronic communication is unauthorized by identifying that a sender address of the electronic communication is excluded from an approved sender list.

Clause 4. The system of clause 3 or any other clause herein, wherein determining that the electronic communication is unauthorized comprises: extracting metadata associated with the electronic communication; parsing the metadata to identifying the sender address; and comparing the sender address to the approved sender list.

Clause 5. The system of clause 1 or any other clause herein, wherein the electronic address pool comprises a subscription list and the at least one computing device is configured to process the electronic communication using the at least one rule to determine whether the electronic communication is authorized by: identifying, via the at least one rule, that a subscriber list was taken without authorization by a third party based on the electronic communication.

Clause 6. The system of clause 5 or any other clause herein, wherein the at least one computing device is further configured to: determine that the electronic communication is unauthorized in response to determining that a domain associated with the electronic communication corresponds to a company unauthorized for the subscriber list.

Clause 7. The system of clause 1 or any other clause herein, wherein the electronic address pool comprises an unsubscribe list, the plurality of electronic destinations are unsubscribed from communications from a particular domain associated with a particular entity, and the at least one rule is configured to identify that the electronic communication originated from the particular domain.

Clause 8. A non-transitory computer-readable medium embodying a program that, when executed in part by any one of one or more computing devices, causes the at least one computing device, comprising: generate an electronic destination configured to be routed to any one of the at least one computing device; insert the electronic destination into a plurality of electronic address pools; generate at least one rule for processing of electronic messages; assign the at least one rule to the electronic destination; monitor the electronic destination for electronic communications; in response to receiving an electronic communication, process the electronic communication using the at least one rule to determine whether the electronic communication is authorized; and in response to the electronic communication being unauthorized, generate a record of the electronic communication being unauthorized.

Clause 9. The non-transitory computer-readable medium of clause 8 or any other clause herein, wherein the program further causes the at least one computing device to: receive a notification from a service provider that an outgoing electronic communication was added to a spam inbox; and modify the at least one rule based on the notification.

Clause 10. The non-transitory computer-readable medium of clause 8 or any other clause herein, wherein the program further causes the at least one computing device to: receive a non-delivered notification in response to an outgoing electronic communication; and modify the at least one rule based on the non-delivered notification.

Clause 11. The non-transitory computer-readable medium of clause 8 or any other clause herein, wherein the program further causes the at least one computing device to: determine that a recipient has not engaged with a plurality of outgoing electronic communications during a predefined duration; and modify the at least one rule based on the determination that the recipient has not engaged with the plurality of outgoing electronic communications during the predefined duration.

Clause 12. The non-transitory computer-readable medium of clause 8 or any other clause herein, wherein the electronic destination comprises a plurality of individual electronic destinations and monitoring the electronic destination comprises: routing a plurality of electronic communications for the plurality of individual electronic destinations to a single inbox; and extracting metadata associated with the plurality of electronic communications.

Clause 13. The non-transitory computer-readable medium of clause 8 or any other clause herein, wherein the electronic destination comprises an email address or a phone number.

Clause 14. A method, comprising: generating, via one of one or more computing devices, an electronic destination configured to be routed to any one of the at least one computing device; inserting, via one of the one or more computing devices, the electronic destination into a plurality of electronic address pools; generating, via one of the one or more computing devices, at least one rule for processing of electronic messages; assigning, via one of the one or more computing devices, the at least one rule to the electronic destination; monitoring, via one of the one or more computing devices, the electronic destination for electronic communications; in response to receiving an electronic communication, processing, via one of the one or more computing devices, the electronic communication using the at least one rule to determine whether the electronic communication is authorized; and in response to the electronic communication being unauthorized, generating, via one of the one or more computing devices, a record of the electronic communication being unauthorized.

Clause 15. The method of clause 14 or any other clause herein, further comprising: receiving, via one of the one or more computing devices, a flag via dashboard for an unflagged electronic communication; and modifying, via one of the one or more computing devices, the at least one rule.

Clause 16. The method of clause 14 or any other clause herein, further comprising: receiving, via one of the one or more computing devices, a flag via dashboard for an unflagged electronic communication; and creating, via one of the one or more computing devices, at least one new rule.

Clause 17. The method of clause 14 or any other clause herein, further comprising a first plurality of electronic address pools associated with a first rule and a second plurality of electronic address pools associated with a second rule.

Clause 18. The method of clause 17 or any other clause herein, further comprising: determining, via one of the one or more computing devices, an outgoing electronic communication sent to the first plurality of electronic address pools was received by at least one electronic destination associated with the second plurality of electronic address pools; and determining, via one of the one or more computing devices, that the outgoing electronic communication violated the second rule.

Clause 19. The method of clause 14 or any other clause herein, further comprising receiving, via one of the one or more computing devices, the electronic communication a single electronic destination across the plurality of electronic address pools.

Clause 20. The method of clause 14 or any other clause herein, further comprising transmitting, via one of the one or more computing devices, a notification to a client.

These and other aspects, features, clauses, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

While various aspects and clauses have been described in the context of a preferred embodiment, additional aspects, features, and methodologies of the claimed systems will be readily discernible from the description herein, by those of ordinary skill in the art. Many embodiments and adaptations of the disclosure and claimed systems other than those herein described, as well as many variations, modifications, and equivalent arrangements and methodologies, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed systems. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed systems. In addition, some steps may be carried out simultaneously, contemporaneously, or in synchronization with other steps.

Aspects, features, and benefits of the claimed devices and methods for using the same will become apparent from the information disclosed in the exhibits and the other applications as incorporated by reference. Variations and modifications to the disclosed systems and methods may be effected without departing from the spirit and scope of the novel concepts of the disclosure.

It will, nevertheless, be understood that no limitation of the scope of the disclosure is intended by the information disclosed in the exhibits or the applications incorporated by reference; any alterations and further modifications of the described or illustrated embodiments, and any further applications of the principles of the disclosure as illustrated therein are contemplated as would normally occur to one skilled in the art to which the disclosure relates.

The foregoing description of the exemplary embodiments has been presented only for the purposes of illustration and description and is not intended to be exhaustive or to limit the devices and methods for using the same to the precise forms disclosed. Many modifications and variations are possible in light of the above teaching.

The embodiments were chosen and described in order to explain the principles of the devices and methods for using the same and their practical application so as to enable others skilled in the art to utilize the devices and methods for using the same and various embodiments and with various modifications as are suited to the particular use contemplated. Alternative embodiments will become apparent to those skilled in the art to which the present devices and methods for using the same pertain without departing from their spirit and scope. Accordingly, the scope of the present devices and methods for using the same is defined by the appended claims rather than the foregoing description and the exemplary embodiments described therein.

What is claimed is:

1. A system, comprising:
    a data store; and
    at least one computing device in communication with the data store, wherein the at least one computing device is configured to:
        generate a plurality of electronic destinations configured to be routed to any one of the at least one computing device;
        insert the plurality of electronic destinations into an electronic address pool;
        generate at least one rule for processing of electronic messages;
        assign the at least one rule to the plurality of electronic destinations;
        monitor the plurality of electronic destinations for electronic communications;
        in response to receiving an electronic communication, process the electronic communication using the at least one rule to determine whether the electronic communication is unauthorized; and
        in response to the electronic communication being unauthorized, generate a record of the electronic communication being unauthorized.

2. The system of claim 1, wherein the at least one computing device is further configured to generate the record of the electronic communication being unauthorized by adding sender information of the electronic communication to a flagged sender table.

3. The system of claim 1, wherein the at least one computing device is further configured to determine that the electronic communication is unauthorized by identifying that a sender address of the electronic communication is excluded from an approved sender list.

4. The system of claim 3, wherein determining that the electronic communication is unauthorized comprises:
   extracting metadata associated with the electronic communication;
   parsing the metadata to identifying the sender address; and
   comparing the sender address to the approved sender list.

5. The system of claim 1, wherein the electronic address pool comprises a subscription list and the at least one computing device is configured to process the electronic communication using the at least one rule to determine whether the electronic communication is authorized by:
   identifying, via the at least one rule, that a subscriber list was taken without authorization by a third party based on the electronic communication.

6. The system of claim 5, wherein the at least one computing device is further configured to:
   determine that the electronic communication is unauthorized in response to determining that a domain associated with the electronic communication corresponds to a company unauthorized for the subscriber list.

7. The system of claim 1, wherein the electronic address pool comprises an unsubscribe list, the plurality of electronic destinations are unsubscribed from communications from a particular domain associated with a particular entity, and the at least one rule is configured to identify that the electronic communication originated from the particular domain.

8. A non-transitory computer-readable medium embodying a program that, when executed in part by any one of one or more computing devices, causes the at least one computing device, comprising:
   generate an electronic destination configured to be routed to any one of the at least one computing device;
   insert the electronic destination into a plurality of electronic address pools;
   generate at least one rule for processing of electronic messages;
   assign the at least one rule to the electronic destination;
   monitor the electronic destination for electronic communications;
   in response to receiving an electronic communication, process the electronic communication using the at least one rule to determine whether the electronic communication is authorized; and
   in response to the electronic communication being unauthorized, generate a record of the electronic communication being unauthorized.

9. The non-transitory computer-readable medium of claim 8, wherein the program further causes the at least one computing device to:
   receive a notification from a service provider that an outgoing electronic communication was added to a spam inbox; and
   modify the at least one rule based on the notification.

10. The non-transitory computer-readable medium of claim 8 wherein the program further causes the at least one computing device to:
   receive a non-delivered notification in response to an outgoing electronic communication; and
   modify the at least one rule based on the non-delivered notification.

11. The non-transitory computer-readable medium of claim 8, wherein the program further causes the at least one computing device to:
   determine that a recipient has not engaged with a plurality of outgoing electronic communications during a predefined duration; and
   modify the at least one rule based on the determination that the recipient has not engaged with the plurality of outgoing electronic communications during the predefined duration.

12. The non-transitory computer-readable medium of claim 8, wherein the electronic destination comprises a plurality of individual electronic destinations and monitoring the electronic destination comprises:
   routing a plurality of electronic communications for the plurality of individual electronic destinations to a single inbox; and
   extracting metadata associated with the plurality of electronic communications.

13. The non-transitory computer-readable medium of claim 8, wherein the electronic destination comprises an email address or a phone number.

14. A method, comprising:
   generating, via one of one or more computing devices, an electronic destination configured to be routed to any one of the at least one computing device;
   inserting, via one of the one or more computing devices, the electronic destination into a plurality of electronic address pools;
   generating, via one of the one or more computing devices, at least one rule for processing of electronic messages;
   assigning, via one of the one or more computing devices, the at least one rule to the electronic destination;
   monitoring, via one of the one or more computing devices, the electronic destination for electronic communications;
   in response to receiving an electronic communication, processing, via one of the one or more computing devices, the electronic communication using the at least one rule to determine whether the electronic communication is authorized; and
   in response to the electronic communication being unauthorized, generating, via one of the one or more computing devices, a record of the electronic communication being unauthorized.

15. The method of claim 14, further comprising:
   receiving, via one of the one or more computing devices, a flag via dashboard for an unflagged electronic communication; and
   modifying, via one of the one or more computing devices, the at least one rule.

16. The method of claim 14, further comprising:
   receiving, via one of the one or more computing devices, a flag via dashboard for an unflagged electronic communication; and
   creating, via one of the one or more computing devices, at least one new rule.

17. The method of claim 14, further comprising a first plurality of electronic address pools associated with a first rule and a second plurality of electronic address pools associated with a second rule.

18. The method of claim 17, further comprising:
- determining, via one of the one or more computing devices, an outgoing electronic communication sent to the first plurality of electronic address pools was received by at least one electronic destination associated with the second plurality of electronic address pools; and
- determining, via one of the one or more computing devices, that the outgoing electronic communication violated the second rule.

19. The method of claim 14, further comprising receiving, via one of the one or more computing devices, the electronic communication a single electronic destination across the plurality of electronic address pools.

20. The method of claim 14, further comprising transmitting, via one of the one or more computing devices, a notification to a client.

\* \* \* \* \*